United States Patent
Toyama et al.

(10) Patent No.: US 10,397,244 B2
(45) Date of Patent: Aug. 27, 2019

(54) SYSTEM AND METHOD FOR DETECTING ATTACK WHEN SENSOR AND TRAFFIC INFORMATION ARE INCONSISTENT

(71) Applicants: TOYOTA JIDOSHA KABUSHIKI KAISHA, Toyota-shi, Aichi-ken (JP); National University Corporation YOKOHAMA National University, Yokohama (JP)

(72) Inventors: Tsuyoshi Toyama, Yokohama (JP); Hisashi Oguma, Kawasaki (JP); Tsutomu Matsumoto, Yokohama (JP); Hideki Gotoh, Tokyo (JP); Tomokazu Moriya, Tokyo (JP)

(73) Assignees: TOYOTA JIDOSHA KABUSHIKI KAISHA, Toyota (JP); NATIONAL UNIVERSITY CORPORATION YOKOHAMA NATIONAL UNIVERSITY, Yokohama (JP)

( * ) Notice: Subject to any disclaimer, the term of this patent is extended or adjusted under 35 U.S.C. 154(b) by 287 days.

(21) Appl. No.: 15/210,392

(22) Filed: Jul. 14, 2016

(65) Prior Publication Data
US 2017/0032671 A1 Feb. 2, 2017

(30) Foreign Application Priority Data
Jul. 30, 2015 (JP) .................................. 2015-151086

(51) Int. Cl.
*H04L 29/06* (2006.01)
*G08G 1/0967* (2006.01)
(Continued)

(52) U.S. Cl.
CPC ............ *H04L 63/123* (2013.01); *B60W 10/00* (2013.01); *B60W 40/00* (2013.01); *G06F 21/00* (2013.01);
(Continued)

(58) Field of Classification Search
CPC ................................. H04N 7/181; G01C 21/30
(Continued)

(56) References Cited

U.S. PATENT DOCUMENTS 8,150,465 B2 * 4/2012 Zhang .................... G08B 21/12
340/531
8,718,861 B1 * 5/2014 Montemerlo ......... B60W 30/00
701/26

(Continued)

FOREIGN PATENT DOCUMENTS

JP 2010-114819 A 5/2010
JP 2010-250607 A 11/2010
(Continued)

*Primary Examiner* — Bryan F Wright
(74) *Attorney, Agent, or Firm* — Oliff PLC

(57) ABSTRACT

Disclosed is a system for detecting an attack, which includes a server and a plurality of vehicles capable of wirelessly communicating with each other. Each of the vehicles has a sensor, a sensor information acquisition unit, a traffic information reception unit, and a transmission unit that transmits the sensor information and the traffic information to the server. The server has a reception unit that receives the sensor information and the traffic information from the vehicles, a verification unit that verifies whether the sensor information and the traffic information are inconsistent with each other, and a notification unit that notifies, when the sensor information and the traffic information are inconsistent with each other, the vehicles of the inconsistency.

10 Claims, 10 Drawing Sheets

(51) Int. Cl.

| | | |
|---|---|---|
| *H04W 12/10* | (2009.01) | |
| *B60W 10/00* | (2006.01) | |
| *B60W 40/00* | (2006.01) | |
| *G06F 21/00* | (2013.01) | |
| *G08G 1/01* | (2006.01) | |
| *G08G 1/017* | (2006.01) | |
| *G08G 1/00* | (2006.01) | |
| *G07C 5/00* | (2006.01) | |
| *G06F 21/57* | (2013.01) | |
| *G06F 21/64* | (2013.01) | |
| *H04L 29/08* | (2006.01) | |
| *G06K 9/00* | (2006.01) | |
| *H04W 84/18* | (2009.01) | |
| *H04W 4/04* | (2009.01) | |

(52) U.S. Cl.
CPC ............ *G06F 21/577* (2013.01); *G06F 21/64* (2013.01); *G06F 21/645* (2013.01); *G07C 5/008* (2013.01); *G08G 1/017* (2013.01); *G08G 1/0112* (2013.01); *G08G 1/0129* (2013.01); *G08G 1/096716* (2013.01); *G08G 1/096741* (2013.01); *G08G 1/096775* (2013.01); *G08G 1/096791* (2013.01); *G08G 1/205* (2013.01); *H04L 63/1483* (2013.01); *H04W 12/10* (2013.01); *G06K 9/00791* (2013.01); *H04L 67/12* (2013.01); *H04W 4/046* (2013.01); *H04W 84/18* (2013.01)

(58) Field of Classification Search
USPC .......................................................... 726/23
See application file for complete search history.

(56) References Cited

U.S. PATENT DOCUMENTS

| | | | |
|---|---|---|---|
| 2009/0228204 A1* | 9/2009 | Zavoli | G01C 21/30 |
| | | | 701/532 |
| 2010/0036595 A1* | 2/2010 | Coy | G08G 1/0104 |
| | | | 701/119 |
| 2015/0290808 A1* | 10/2015 | Renkis | H04N 7/181 |
| | | | 700/257 |
| 2015/0358329 A1 | 12/2015 | Noda et al. | |
| 2016/0221581 A1* | 8/2016 | Talwar | B60W 40/06 |
| 2017/0008521 A1* | 1/2017 | Braunstein | G01C 21/32 |

FOREIGN PATENT DOCUMENTS

| | | |
|---|---|---|
| JP | 2014-138380 A | 7/2014 |
| JP | 2014-168219 A | 9/2014 |

* cited by examiner

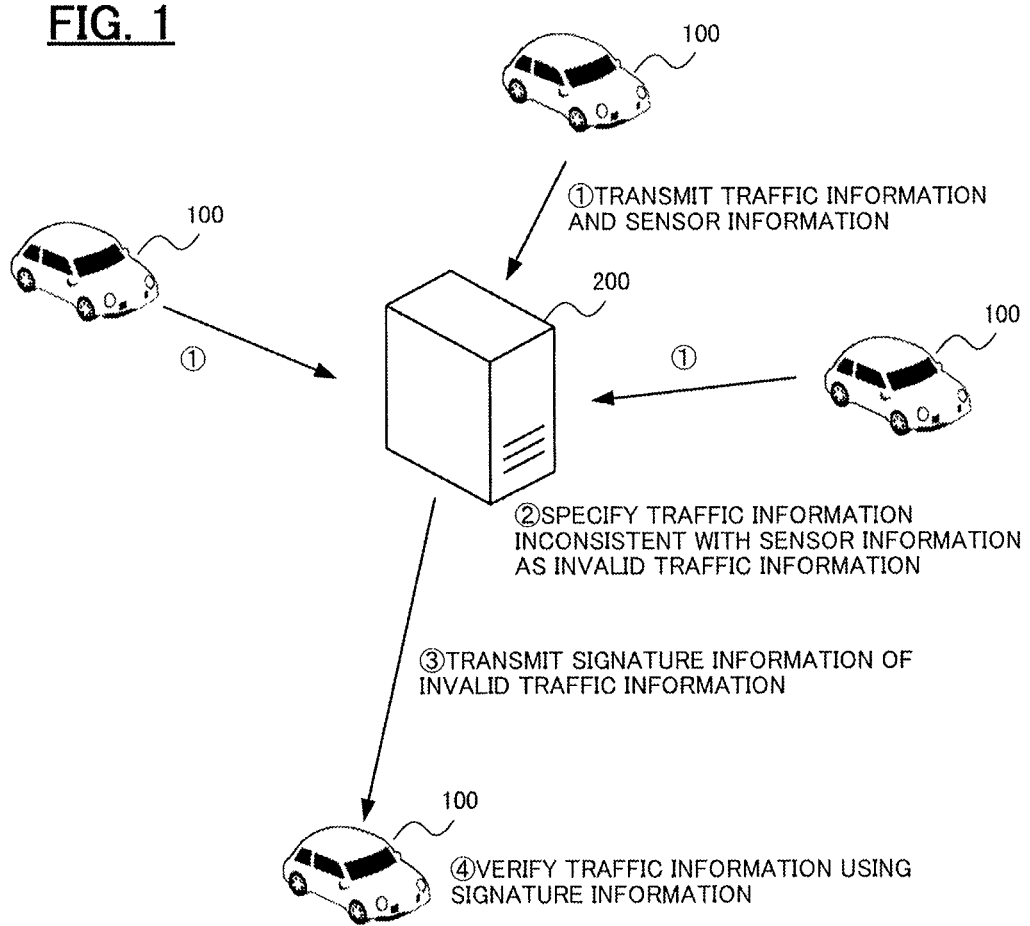

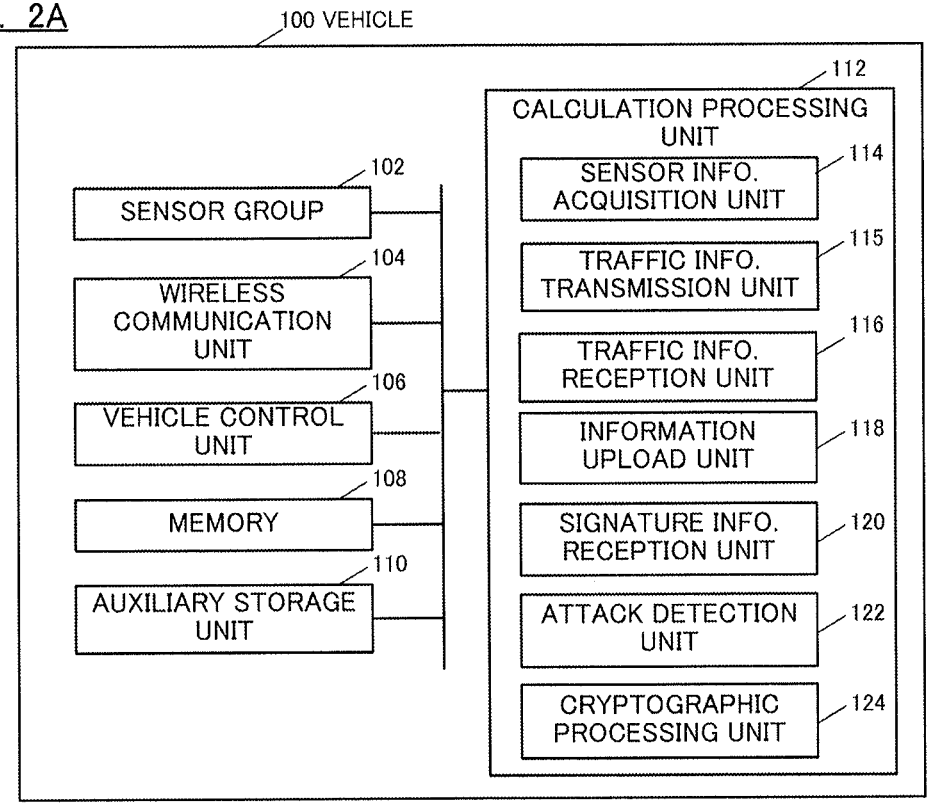
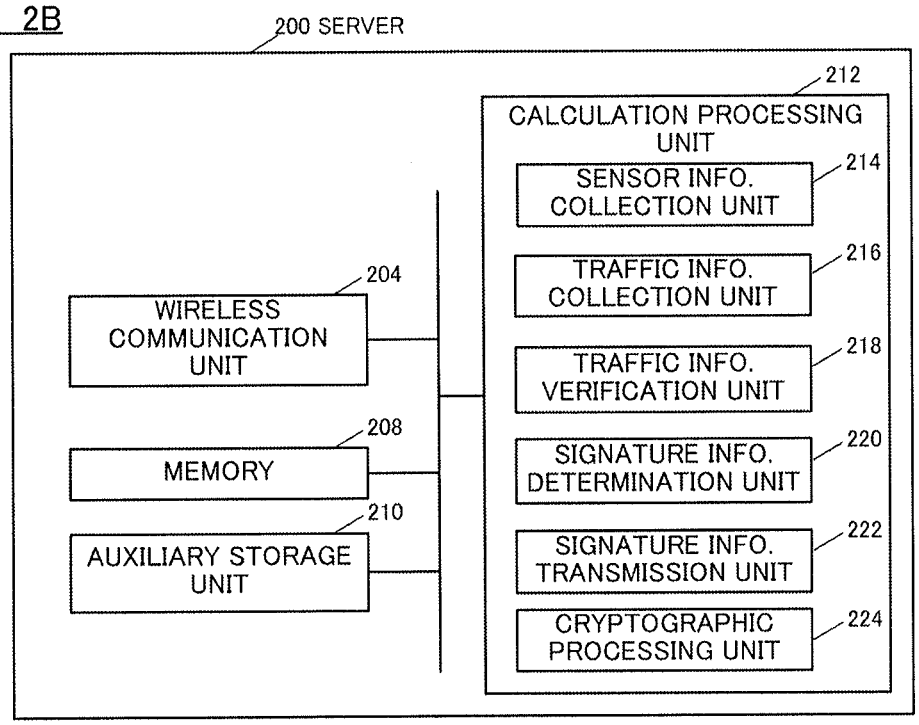

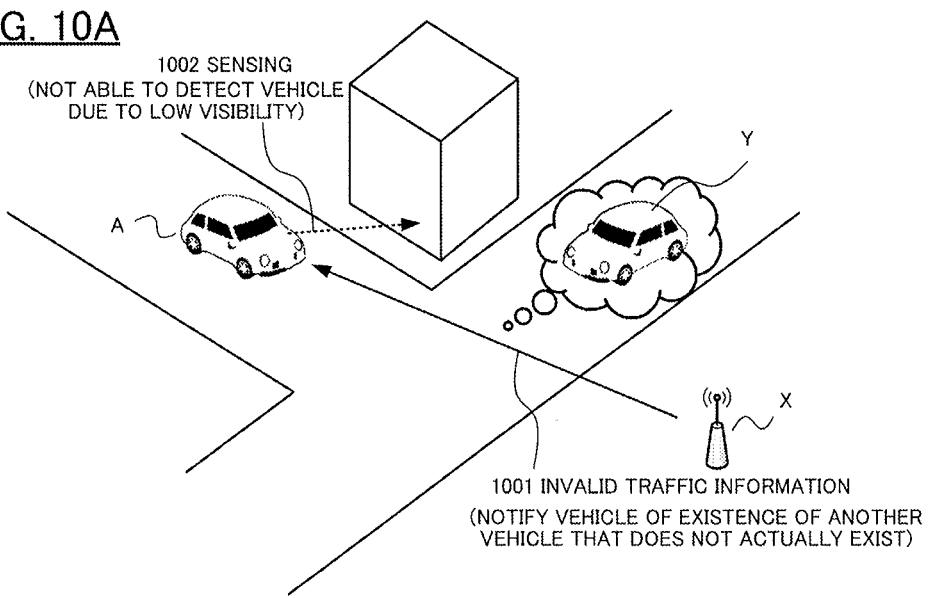
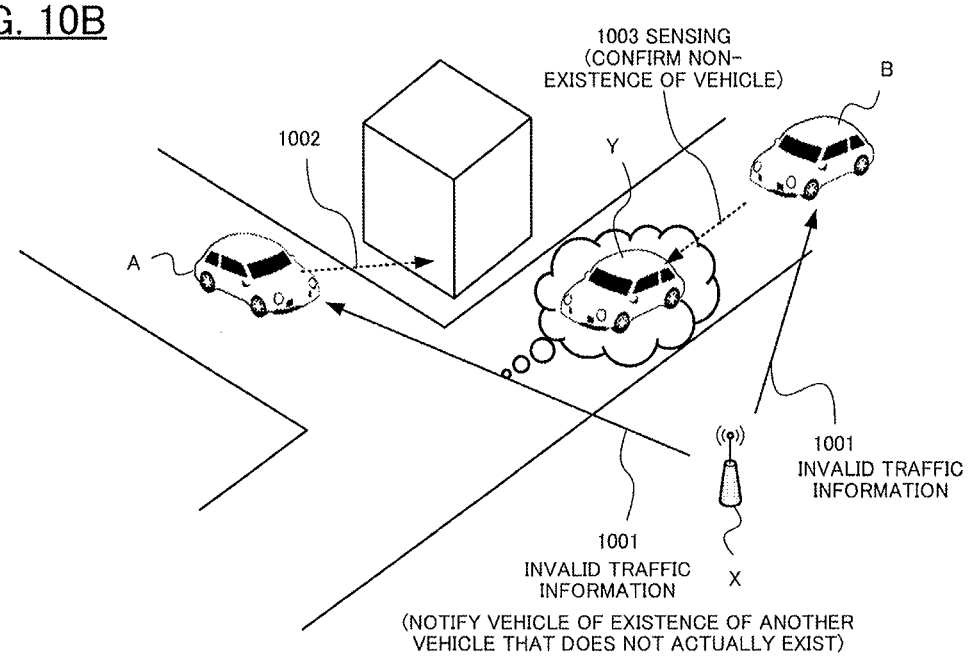

SYSTEM AND METHOD FOR DETECTING ATTACK WHEN SENSOR AND TRAFFIC INFORMATION ARE INCONSISTENT

BACKGROUND OF THE INVENTION

Field of the Invention

The present invention relates to a system and method for detecting an attack, and more specifically to a system and method for using traffic information transmitted to vehicles to detects an attack.

Description of the Related Art

In recent years, research and development have been promoted for systems in which vehicles are equipped with communication functions and driving assistance and automatic driving are performed for the vehicles based on information transmitted from other vehicles and roadside machines. Herein, control performed based on invalid information transmitted from an outside may lead to traffic snarls. For example, an attack is assumed in which information indicating the existence of a vehicle that does not actually exist is transmitted to circumjacent objects, thereby hindering normal traffic. To cope with this, it is desired to verify the validity of information transmitted from an outside.

Japanese Patent Application Laid-open No. 2014-138380 discloses a method for detecting an attack on an in-vehicle system, the method including: receiving verification messages from both a transmission electronic control unit (ECU) and a reception ECU in the in-vehicle system; and determining whether these verification messages are consistent with each other.

Japanese Patent Application Laid-open No. 2014-168219 discloses placing limitations on access to vehicle-network information that is generated when running a program, based on an access right level for each program and an access permission level for each information.

Japanese Patent Application Laid-open No. 2010-250607 discloses an invalid access analysis system in which an unregistered attack pattern is registered and a program is updated when the unregistered attack pattern is acquired through the analysis of a network attack log. In the technology of Japanese Patent Application Laid-open No. 2010-250607, it is possible to analyze an attack pattern using the methods of Japanese Patent Application Laid-open Nos. 2014-138380 and 2014-168219 and register the analyzed attack pattern to detect an attack on a vehicle.

However, what is disclosed by Japanese Patent Application Laid-open No. 2014-138380 is an attack detecting technology considering communications inside a vehicle system, and what is disclosed by Japanese Patent Application Laid-open No. 2014-168219 is an attack detecting technology for an external apparatus accessing the internal units of a vehicle; none of the above technologies is capable of determining whether information transmitted from an outside is valid.

As a technology to verify the validity of transmitted information, electronic signatures are available. With electronic signatures, however, it is only possible to verify the falsification of transmitted information and the spoofing of transmitters; verifying the validity of the transmitted information itself is not possible.

Patent Document 1: Japanese Patent Application Laid-open No. 2014-138380

Patent Document 2: Japanese Patent Application Laid-open No. 2014-168219

Patent Document 3: Japanese Patent Application Laid-open No. 2010-250607

SUMMARY OF THE INVENTION

In view of the above problems, the present invention has an object of providing a technology by which it is possible to detect an attack by communication in a system in which vehicles receive information from an outside through the communication.

In order to achieve the above object, the present invention compares traffic information received by vehicles through wireless communication with sensor information acquired by the vehicles through their own sensors and determines that the traffic information is invalid when the traffic information and the sensor information are inconsistent with each other.

Traffic information is any information associated with traffic and includes information on vehicles such as positions, movement speeds and movement directions of vehicles, information on traffic signals, information on obstacles on roads, information on traffic jams, information on road-surface conditions, etc.

For example, there is a case in which sensor information indicates that nothing exists at a position but traffic information indicates that a vehicle exists at the position. In this case, there is a high possibility that the traffic information and the sensor information are inconsistent with each other and the traffic information is invalid. Here, the position of the vehicle is just an example. The verification of the validity of traffic information using sensor information is possible so long as the traffic information can be generated based on the sensor information.

A first aspect of the present invention provides a system for detecting attack having a server and a plurality of vehicles capable of wirelessly communicating with each other. Each of the plurality of vehicles has a sensor, a sensor information acquisition unit adapted to acquire sensor information from the sensor, a traffic information reception unit adapted to receive traffic information through wireless communication, and a transmission unit adapted to transmit the sensor information and the traffic information to the server. The server has a reception unit adapted to receive the sensor information and the traffic information from at least any of the plurality of vehicles, a verification unit adapted to verify whether the sensor information and the traffic information are inconsistent with each other, and a notification unit adapted to notify, when the sensor information and the traffic information are inconsistent with each other, at least any of the plurality of vehicles of the inconsistency between the sensor information and the traffic information. Here, traffic information and sensor information compared with each other may be information acquired by the same vehicle or information acquired by different vehicles.

As described above, a vehicle transmits acquired traffic information and sensor information to a server, and the server performs the analysis of the information. Thus, an attack by the traffic information may be detected.

In the first aspect, the notification unit may be adapted to notify at least any of the plurality of vehicles of signature information indicating characteristics of the traffic information inconsistent with the sensor information, and each of the plurality of vehicles may have a storage unit adapted to store the signature information received from the server and may not rely on the traffic information consistent with the signature information notified from the notification unit.

According to this configuration, each vehicle is allowed to detect an attack detected by a server.

Signature information is information indicating the characteristics of traffic information. For example, when traffic information includes the identifier of the transmitter of the traffic information, the identifier of the transmitter of the traffic information may be employed as signature information.

In addition, in the first aspect, the traffic information preferably includes a position of an object existing on a road, and the verification unit is preferably adapted to determine the inconsistency between the sensor information and the traffic information when being able to estimate from the sensor information that the object does not exist at the position of the object indicated by the traffic information. Here, an object existing on a road includes a vehicle, an obstacle, or the like. When the transmitter of traffic information is a vehicle, information indicating the position of the transmitter's vehicle corresponds to the traffic information and the transmitter's vehicle itself corresponds to an object existing on a road.

It is possible to sense the presence or absence and the position of an object existing on a road with, for example, cameras (a visible light camera and an infrared camera), radars (a millimeter-wave radar, a quasi-millimeter-wave radar, and a near-infrared laser radar), and ultrasonic sonar equipment. Accordingly, the inconsistency between traffic information and sensor information may be determined when the existence of an object at a position indicated by traffic information is not confirmed by the sensor information. In addition, the inconsistency between traffic information and sensor information may be determined when it is understandable from the sensor information that an object different from an object (for example, a vehicle) of a type indicated by the traffic information exists even in a case in which any object exists at a position indicated by the traffic information.

In the first aspect, the traffic information may further include at least any of a movement speed and a movement direction of the object, and the verification unit may be adapted to determine the inconsistency between the sensor information and the traffic information when being able to estimate from the sensor information that one of a movement speed and a movement direction of the object existing at the position of the object indicated by the traffic information is inconsistent with one of the movement speed and the movement direction indicated by the traffic information.

In the first aspect, the traffic information may include information on a road condition, and the verification unit may be adapted to determine the inconsistency between the sensor information and the traffic information when the road condition indicated by the traffic information is inconsistent with a road condition acquired from the sensor information. A road condition includes road-surface conditions such as the presence or absence of traffic jams, the presence or absence of road constructions, traffic lane limitations, and the icing of roads.

A second aspect of the present invention provides a system for detecting an attack including: a first acquisition unit adapted to acquire sensor information acquired from a sensor of a vehicle; a second acquisition unit adapted to acquire traffic information received by the vehicle through wireless communication; and a verification unit adapted to verify whether the sensor information and the traffic information are inconsistent with each other.

The system according to the second aspect does not limits its configurations and acquisition method so long as it is capable of acquiring sensor information and traffic information. For example, each of the above units of the system may be provided in an apparatus different from a vehicle, and sensor information and traffic information may be acquired from the vehicle through wireless communication. Alternatively, each of the units of the system may be provided in a vehicle, and sensor information and traffic information may be acquired from a sensor and a wireless communication unit installed in the vehicle.

A third aspect of the present invention provides a vehicle including: a sensor; a sensor information acquisition unit adapted to acquire sensor information from the sensor; a traffic information reception unit adapted to receive traffic information through wireless communication; a transmission unit adapted to transmit the sensor information and the traffic information to a server; and a verification unit adapted to verify whether the sensor information and the traffic information are inconsistent with each other.

According to the third aspect, a vehicle determines whether traffic information is valid based on its own sensor information.

In the third aspect, the vehicle preferably further includes a notification unit adapted to transmit signature information indicating characteristics of the traffic information determined by the verification unit to be inconsistent with the sensor information to one of the circumjacent vehicle and the server.

According to this configuration, circumjacent vehicles may be notified of the existence of invalid traffic information directly or via a server.

Note that the present invention may be regarded as a system for detecting an attack, a vehicle, or a server having at least some of the above units. In addition, the present invention may be regarded as a method in which at least some of processing by the above units is performed. Moreover, the present invention may be regarded as a computer program for causing a computer to perform the method or may be regarded as a computer-readable storage medium storing the computer program permanently. Each of the above units and the processing may be combined with each other to a maximum extent to constitute the present invention.

According to an embodiment of the present invention, it is possible to detect an attack by communication in a system in which vehicles receive information from an outside.

BRIEF DESCRIPTION OF THE DRAWINGS

FIG. 1 is a diagram showing the outline of the system of a first embodiment;

FIGS. 2A and 2B are a function block diagram of a vehicle and a function block diagram of a server, respectively;

FIGS. 10A and 10B are a diagram for describing an attack on the communication system between vehicles and a diagram for describing a method for detecting the attack, respectively.

Figure 3A:
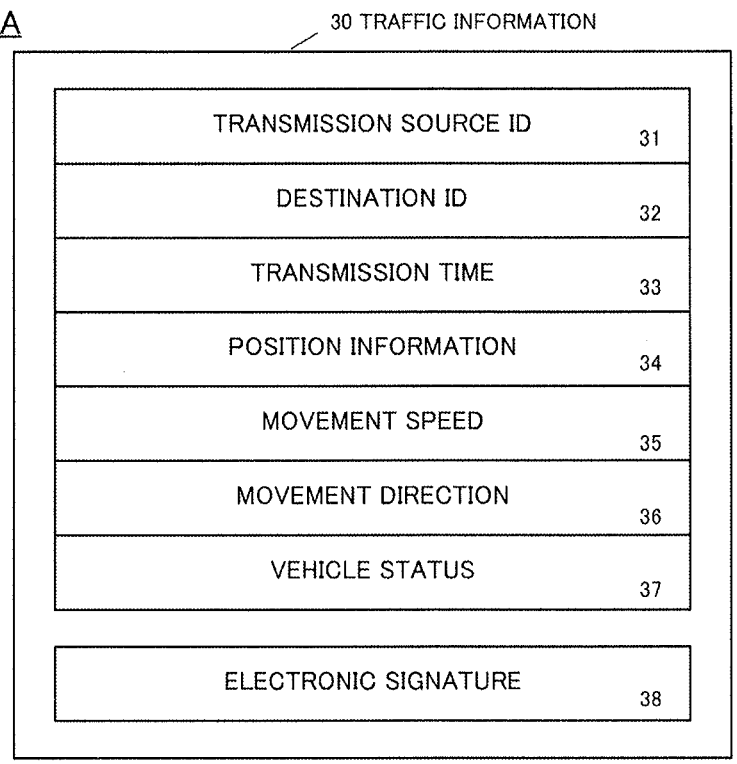
FIGS. 3A and 3B are a diagram showing the message format of traffic information and the message format of sensor information, respectively.

DESCRIPTION OF THE EMBODIMENTS (Outline of System)

Automatic driving vehicles control themselves using sensor information acquired from their own sensors and traffic information acquired from circumjacent vehicles or roadside machines through communication. Attacks on such automatic driving vehicles by the transmission of invalid traffic information to cause traffic snarls are assumed.

As shown in, for example, FIG. 10A, it is assumed that a roadside machine X transmits traffic information on the existence of a vehicle Y that does not actually exist to a vehicle A entering an intersection (1001). When the vehicle A is not allowed to sense the existence of the vehicle Y by its own sensor due to the poor view of the intersection (1002), the vehicle A is forced to remain waiting to enter the intersection.

In such a circumstance, as shown in FIG. 10B, a vehicle B approaching the intersection from another direction is allowed to sense the fact that the vehicle Y whose existence is notified by the traffic information from the roadside machine X does not actually exist by its own sensor (1003). That is, the vehicle B is allowed to determine that the traffic information transmitted from the roadside machine X is invalid. Therefore, when the vehicle B notifies the vehicle A of the fact that the vehicle Y does not actually exist, the vehicle A is allowed to perform automatic driving without relying on the traffic information from the roadside machine X.

The above example assumes a case in which a roadside machine transmits invalid traffic information, but vehicles or other wireless communication machines may transmit invalid traffic information. In addition, control using traffic information transmitted from circumjacent objects is not limited to automatic driving but may include driving assistance and any other control.

First Embodiment

Configuration

This embodiment describes a system for detecting an attack that detects invalid traffic information transmitted to vehicles. As shown in FIG. 1, the system is constituted by a plurality of vehicles 100 and a server 200 capable of wirelessly communicating with each other.

In the first embodiment, each of the plurality of vehicles 100 transmits traffic information received from circumjacent objects and sensor information acquired by its own sensor to the server 200. The server 200 accumulates the traffic information and the sensor information collected from the vehicles 100 and specifies traffic information inconsistent with the sensor information (hereinafter called invalid traffic information). The server 200 specifies signature information indicating the characteristics of the invalid traffic information and notifies the vehicles 100 of the same. The vehicles 100 have an intrusion detection system (IDS) or an intrusion prevention system (IPS) and detect the invalid traffic information using the signature information notified from the server 200.

[Vehicle]

FIG. 2A is a block diagram showing the configurations of the vehicle 100. As shown in FIG. 2A, the vehicle 100 has a sensor group 102, a wireless communication unit 104, a vehicle control unit 106, a memory 108, a sub-storage unit 110, and a calculation processing unit 112.

The sensor group 102 includes a plurality of sensors used to acquire the inner statuses of the vehicle and environmental conditions around the vehicle. The sensors used to acquire the inner statuses of the vehicle include a position information sensor, a direction sensor, a speed sensor, an acceleration sensor, a yaw rate sensor, a steering angle sensor, an accelerator opening sensor, a braking pressure sensor, an engine rotational speed sensor, or the like. The sensors used to acquire environmental conditions around the vehicle include cameras (a visible light camera and an infrared camera), radars (a millimeter-wave radar, a quasi-millimeter-wave radar, and a near-infrared laser radar), ultrasonic sonar equipment, illumination sensors, or the like.

The wireless communication unit 104 is a unit used to wirelessly communicate with other vehicles 100 and the server 200. The standard of wireless communication is not limited to a specific system, and wireless LAN (IEEE 802.11a/b/g/n/ac), Mobile WiMAX (IEEE 802.16e), iBurst, WAVE (IEEE 802.20), DSRC (Dedicated Short Range Communication), mobile telephone communication (3G and LTE), or the like is available as such. The wireless communication unit may be used alone to communicate with other vehicles 100 and the server 200, or different wireless communication units may be used to separately communicate with other vehicles 100 and the server 200.

The vehicle control unit 106 is constituted by one or a plurality of electronic control units (ECUs) that performs control to drive an engine (a driving force), steering, braking, or the like.

The memory 108 is a main storage unit such as a random access memory (RAM). The sub-storage unit 110 is a magnetic disc, a semi-conductor memory, or the like. The vehicle 100 preferably includes, besides these units, input units such as a touch panel and a button and output units such as a display and a speaker.

The calculation processing unit 112 is a processor such as a central processing unit (CPU) and a micro processing unit (MPU) and realizes various functions by reading a program stored in the sub-storage unit 110 into the memory 108 and running the same. The calculation processing unit 112 realizes, for example, the respective functions of a sensor information acquisition unit 114, a traffic information transmission unit 115, a traffic information reception unit 116, an information upload unit 118, a signature information reception unit 120, an attack detecting unit 122, and a cryptographic processing unit 124. However, some or all of these functions may be realized by an application specific integrated circuit (ASIC), a field programmable gate array (FPGA), a digital signal processor (DSP), or the like. In addition, the calculation processing unit 112 is not necessarily constituted by a single processor but may be constituted by a plurality of processors. For example, the cryptographic processing unit 124 is preferably mounted by a dedicated security chip.

The sensor information acquisition unit 114 acquires sensor information from the sensor group 102 periodically or as occasion demands. The acquired sensor information is stored in the memory 108 and the sub-storage unit 110 (hereinafter collectively called a storage unit).

The traffic information transmission unit 115 transmits traffic information generated based on sensor information acquired by the sensor information acquisition unit 114. The traffic information may be any information on traffic. An example of the traffic information is information on the vehicle such as a position, a movement speed, and a movement direction of the vehicle, information on traffic signals, information on obstacles on roads, information on traffic jams, and information on road-surface conditions. In the first embodiment, the traffic information transmission unit 115 periodically transmits traffic information 30 in a format shown in FIG. 3A.

The transmitted traffic information 30 includes a transmission source ID 31, a destination ID 32, a transmission time 33, position information 34, a movement speed 35, a movement direction 36, and a vehicle status 37, and also includes an electronic signature 38 for these information. The transmission source ID 31 is an identifier used to identify a vehicle that transmits the traffic information 30. The destination ID 32 is an identifier used to identify a destination vehicle of the traffic information 30. When the traffic information 30 is to be broadcasted, a value indicating that the traffic information 30 is broadcasting information is stored in the destination ID 32. The transmission time 33 is a time at which the traffic information 30 is generated. The position information 34 is, for example, information acquired from a position information sensor such as a global positioning system (GPS) and expressed in a format using a latitude, a longitude, and an altitude or a format using a map code. The movement speed 35 is a movement speed of the vehicle 100 acquired from a speed sensor. The movement direction 36 is a movement direction of the vehicle 100 acquired from a direction sensor. The vehicle status 37 is information indicating any other statuses of the vehicle 100. The electronic signature 38 is added to detect spoofing and falsification. As the electronic signature 38, a digital signature based on a public encryption system is, for example, available.

The traffic information reception unit 116 receives traffic information from circumjacent vehicles and roadside machines via the wireless communication unit 104. When an electronic signature is added to the traffic information, the cryptographic processing unit 124 verifies the electronic signature. In addition, the attack detecting unit 122 verifies whether the received traffic information is valid. The traffic information determined to be valid is stored in the storage unit and used for vehicle control such as automatic driving.

The information upload unit 118 transmits (uploads) sensor information acquired by the sensor information acquisition unit 114 and traffic information received by the traffic information reception unit 116 to the server 200 via the wireless communication unit 104. The traffic information may be uploaded in a format the same as or different from a format with which the traffic information is transmitted to the vehicle (FIG. 3A).

Figure 3B:
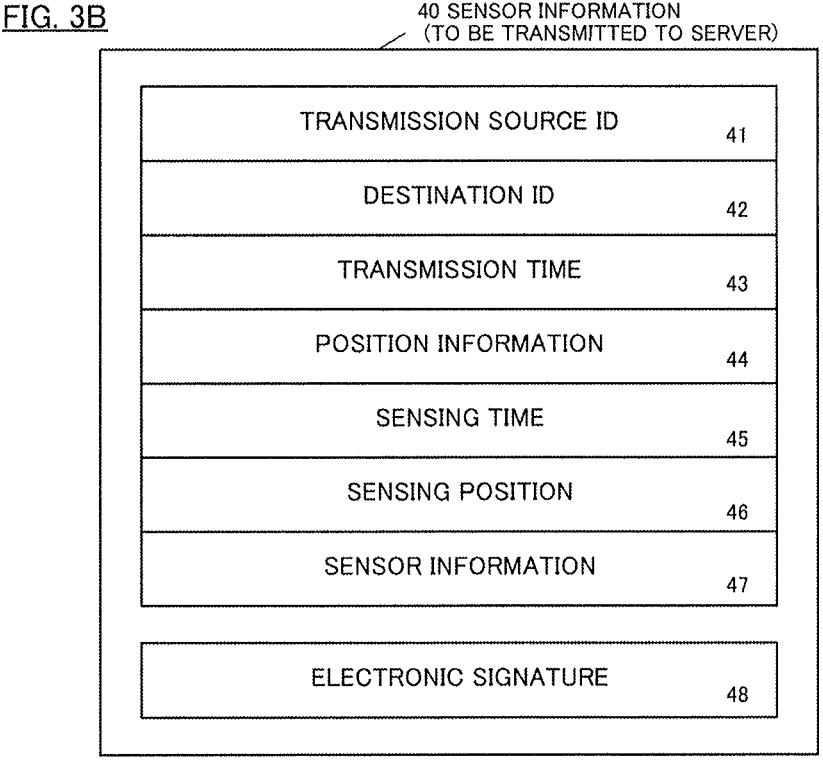

The format of the uploaded sensor information is shown in FIG. 3B. Uploaded sensor information 40 includes a transmission source ID 41, a destination ID 42, a transmission time 43, position information 44, a sensing time 45, a sensing position 46, and sensor information 47, and also includes an electronic signature 48 for these information. The transmission source ID 41, the destination ID 42, the transmission time 43, the position information 44, and the electronic signature 48 are the same as those included in the traffic information 30. The sensing time 45 is a time at which the sensor information 47 is acquired. The sensing position 46 is a position of the vehicle 100 at a time at which the sensor information 47 is acquired. The sensor information 47 is sensor information acquired from the sensor group 102. Here, the embodiment describes an example in which only one sensor information is stored in one message and transmitted, but a plurality of sensor information may be stored in one message and transmitted. In this case, a plurality of sensor information having almost the same sensing time and the same sensing position may be collectively transmitted, or a sensing time and a sensing position may be stored for each sensor information to collectively transmit any sensor information.

The signature information reception unit 120 receives signature information (different from an electronic signature) indicating the characteristics of invalid traffic information from the server 200. The received signature information is stored in the storage unit and used when the attack detecting unit 122 detects invalid information.

The attack detecting unit 122 detects invalid information from information received through wireless communication. Specifically, the attack detecting unit 122 determines that information consistent with signature information stored in the storage unit is invalid information.

The cryptographic processing unit 124 performs the addition and verification of electronic signatures, encryption processing, decryption processing, or the like. Since electronic signatures based on a public encryption system are used in the first embodiment, the cryptographic processing unit 124 performs the addition and verification of the electronic signatures. By the cryptographic processing unit 124, the vehicle is allowed to verify whether traffic information transmitted from circumjacent vehicles 100 and signature information transmitted from the server 200 are valid. In addition, the cryptographic processing unit 124 adds electronic signatures to traffic information that is to be transmitted to circumjacent vehicles 100 and sensor information and traffic information that are to be transmitted to the server 200.

[Server]

FIG. 2B is a block diagram showing the configurations of the server 200. As shown in FIG. 2B, the server 200 is a general-purpose computer and has a wireless communication unit 204, a memory 208, an auxiliary storage unit 210, and a calculation processing unit 212. Since the configurations of the server 200 are the same as those of the vehicle 100, their descriptions will be omitted.

The calculation processing unit 212 realizes the functions of a sensor information collection unit 214, a traffic information collection unit 216, a traffic information verification unit 218, a signature information determination unit 220, a signature information transmission unit 222, and an cryptographic processing unit 224.

The sensor information collection unit 214 receives sensor information transmitted from the vehicle 100 via the wireless communication unit 204 and stores the same in a storage unit. The traffic information collection unit 216 receives traffic information transmitted from the vehicle 100 via the wireless communication unit 204 and stores the same in the storage unit.

The traffic information verification unit 218 verifies whether traffic information collected by the traffic information collection unit 216 is inconsistent with sensor information collected by the sensor information collection unit 214. The inconsistency between traffic information and sensor information corresponds to, for example, a case in which the traffic information indicates the existence of a vehicle at a certain position but the sensor information indicates nothing or the existence of any object other than the vehicle at the position. In addition, the inconsistency between traffic information and sensor information also corresponds to a case in which a vehicle exists at a position indicated by the traffic information but a movement speed or a movement direction of the vehicle indicated by the traffic information is different from a movement speed or a movement direction of the vehicle indicated by the sensor information.

Verification processing by the traffic information verification unit 218 is briefly described here since it will be described in detail with a flowchart later. The traffic information verification unit 218 verifies whether associated sensor information is consistent with traffic information for each of the traffic information collected by the traffic information collection unit 216. The traffic information verification unit 218 determines that traffic information is invalid when there is a lot of sensor information inconsistent with the traffic information.

The signature information determination unit 220 determines signature information indicating the characteristics of traffic information determined to be invalid by the traffic information verification unit 218. In other words, it can be said that the signature information is information in which the pattern of invalid information is defined. For example, when a certain vehicle transmits invalid traffic information, the signature information determination unit 220 determines as the signature information a pattern in which the transmission source ID 31 equals the ID of the vehicle. In addition, when a plurality of vehicles having different IDs transmits, for example, traffic information in which the position information 34, the movement speed 35, and the movement direction 36 have specific values, the signature information determination unit 220 may determine as the signature information a pattern in which these fields have the specific values. The signature information may be of any type so long as it is capable of specifying invalid traffic information.

The signature information transmission unit 222 transmits signature information on invalid traffic information determined by the signature information determination unit 220 to the vehicle 100 via the wireless communication unit 204. Thus, the attack detecting unit 122 of the vehicle 100 is allowed to detect an attack based on the latest signature information.

The cryptographic processing unit 224 performs the addition and verification of electronic signatures, encryption processing, decryption processing, or the like. By the cryptographic processing unit 224, the server 200 is allowed to verify whether traffic information and sensor information transmitted from the vehicle 100 are valid. In addition, the cryptographic processing unit 224 adds electronic signatures to signature information that is to be transmitted to the vehicle 100.

<Processing>

[Operations of Vehicle]

A description will be given of processing by the vehicle 100 with reference to the flowcharts of FIGS. 4 and 5. Note that although each of the processing is successively performed in the flowcharts, the processing may not be necessarily performed in this order but may be performed in different orders or in parallel.

First, the sensor information acquisition unit 114 acquires sensor information from the sensor group 102 (S101). Note that the acquisition of sensor information is periodically performed. The time interval of the acquisition may be different for each sensor or may be the same for all sensors. The sensor information acquisition unit 114 stores the acquired sensor information in the storage unit.

Then, the traffic information reception unit 116 receives traffic information from other vehicles via the wireless communication unit 104 (S102). The vehicle 100 performs the verification processing of the received traffic information (S103). A description will be given in detail of the verification processing S103 of the traffic information with reference to the flowchart of FIG. 5. First, the vehicle 100 verifies the electronic signature 38 of the traffic information using the cryptographic processing unit 124 (S201). When the verification fails (NO in S202), the content of the information is falsified and thus the vehicle 100 is allowed to determine that the received traffic information is invalid (S206). On the other hand, when the verification of the signature is successful (YES in S202), it turns out that the content of the information is neither falsified nor spoofed. However, even in this case, there is a possibility that the content of the traffic information is invalid. Therefore, the attack detecting unit 122 verifies the traffic information using signature information (S203). The attack detecting unit 122 finds out whether the traffic information is consistent with the signature information. When the traffic information matches with the signature information (YES in S204), the attack detecting unit 122 determines that the traffic information is invalid (S206). On the other hand, when the received traffic information does not match with the signature information (NO in S204), the attack detecting unit 122 is allowed to determine that the received traffic information is valid (S205).

Figure 4:
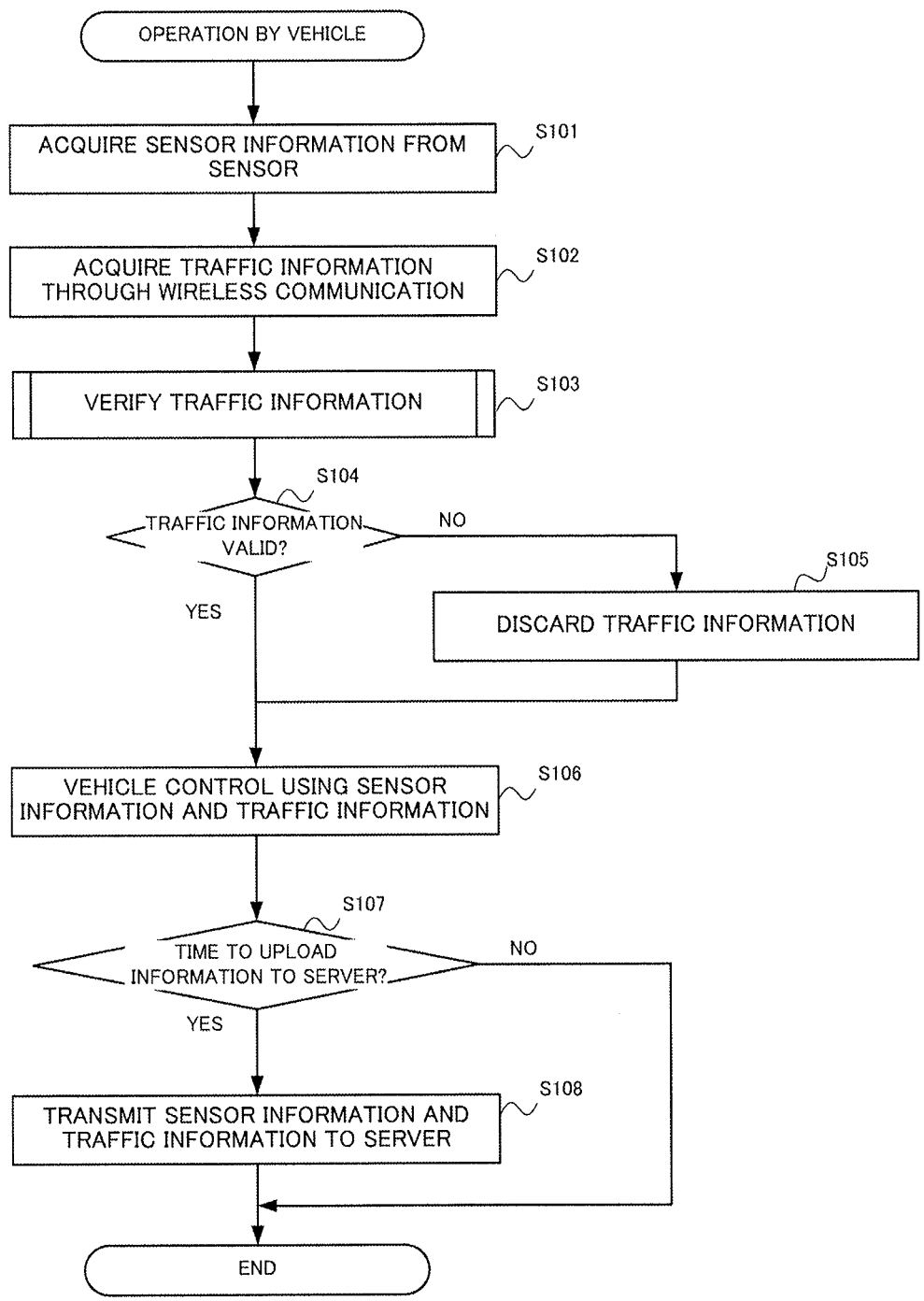
FIG. 4 is a flowchart showing the operations of the vehicle in the first embodiment.
Figure 5:
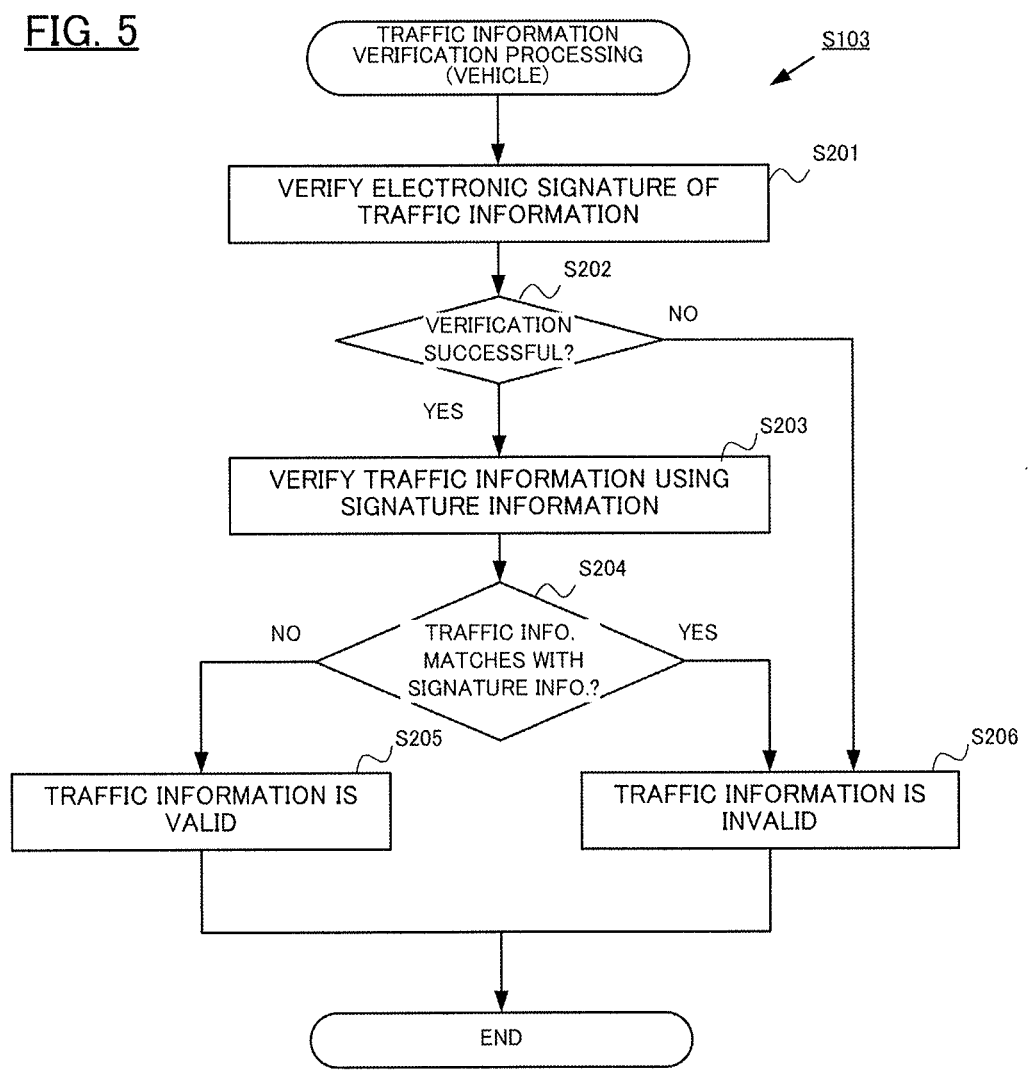
FIG. 5 is a flowchart showing traffic information verification processing by the vehicle in the first embodiment.

Reference is again made to the flowchart of FIG. 4. When it is determined by the traffic information verification processing S103 that the traffic information is invalid (NO in S104), the vehicle 100 discards the received traffic information (S105). When it is determined that the traffic information is valid (YES in S104), the vehicle 100 receives the traffic information as it is.

The vehicle control unit 106 performs the automatic driving control of the vehicle 100 using the sensor information acquired from the sensor group 102 and the traffic information whose validity has been verified. Note that in the processing of the flowchart of FIG. 4, the vehicle 100 determines whether the traffic information is valid. When it is determined that the traffic information is invalid, the vehicle 100 discards the traffic information and does not use the same for the control. However, rather than discarding the traffic information, the vehicle 100 may use the traffic information for the control with the recognition that the traffic information is unreliable. For example, when unreliable traffic information is acquired, the vehicle 100 may confirm whether the traffic information is valid based on sensor information acquired from the sensor group 102 or may perform sensing again with the sensor group 102. In addition, the vehicle 100 may decelerate or take avoidance action in advance for safety with the recognition that the traffic information is invalid. Moreover, in the processing of the flowchart of FIG. 4, the vehicle 100 makes an alternative decision as to whether the traffic information is valid or invalid. However, the vehicle 100 may evaluate the possibility of the validity of traffic information at three or more levels and use the traffic information for the automatic driving control in consideration of its evaluation value (reliability).

The vehicle 100 determines whether now is the time to upload the information to the server 200 (S107). When now is the time to upload the information (YES in S107), the information upload unit 118 transmits the sensor information acquired by the sensor information acquisition unit 114 and the traffic information received by the traffic information reception unit 116 to the server 200 (S108). The time to upload the information to the server 200 is not particularly limited. For example, the information upload unit 118 may transmit the information at any time at which the vehicle 100 is capable of communicating with the server 200, or may transmit the information on the condition that the vehicle 100 stops. In addition, the information upload unit 118 may collectively upload the sensor information and the traffic information when the engine of the vehicle 100 stops.

[Operations of Server]

Figure 6:
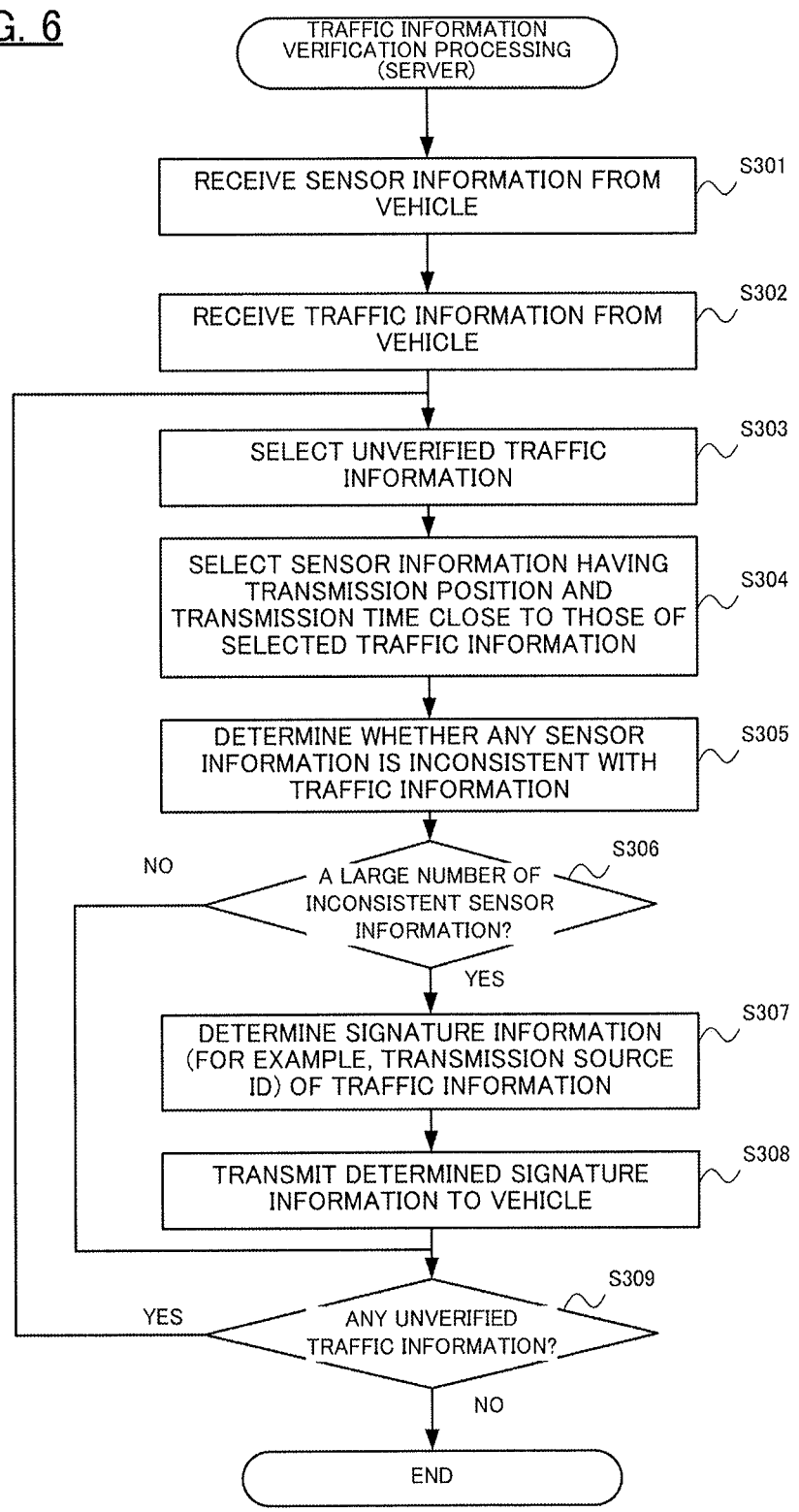
FIG. 6 is a flowchart showing traffic information verification processing by the server in the first embodiment.

A description will be given of processing by the server 200 with reference to the flowchart of FIG. 6. Note that although each of the processing is successively performed in the flowchart, the processing may not be necessarily performed in this order but may be performed in different orders or in parallel.

The sensor information collection unit 214 receives sensor information from the vehicle 100 via the wireless communication unit 204 (S301) and stores the same in the storage unit. Then, the traffic information collection unit 216 receives traffic information from the vehicle 100 via the wireless communication unit 204 (S302) and stores the same in the storage unit. Although not shown in the flowchart, the server 200 preferably verifies the electronic signatures 38 and 48 of the traffic information and the sensor information by the cryptographic processing unit 224 and discards the traffic information and sensor information when the verification of the electronic signatures fails.

The traffic information verification unit 218 selects traffic information that has not been verified from among the received traffic information (S303). When there is a plurality of unverified traffic information, selection of the information may be made on any basis. The traffic information verification unit 218 finds out whether the selected traffic information is inconsistent with the sensor information to verify the validity of the traffic information.

Specifically, the traffic information verification unit 218 first selects sensor information having an acquisition time and an acquisition position (the sensing time 45 and the sensing information 46) close to the transmission time and the transmission position (the transmission time 33 and the transmission information 34) of the selected traffic information (S304). This processing aims to narrow down sensor information capable of verifying the validity of information indicated by traffic information. Accordingly, sensor information having a position and a time "close" to the position and the time of traffic information indicates sensor information by which the validity of information indicated by the traffic information may be determined with a high possibility. For example, when traffic information notifying the existence of a vehicle is verified, sensor information acquired from the vehicle running on the same road at almost the same time is selected.

The traffic information verification unit 218 determines whether each of the sensor information selected in step S304 is inconsistent with the traffic information selected in step S303 (S305). For example, for the existence of a vehicle, when the existence of the vehicle at a position indicated by traffic information is estimated from sensor information, the traffic information verification unit 218 may determine that the traffic information is consistent with the sensor information. On the other hand, when nothing exists at a position indicated by traffic information or when the existence of any object other than a vehicle is estimated, the traffic information verification unit 218 may determine that the traffic information is inconsistent with sensor information. In addition, when the existence of a vehicle at a position indicated by traffic information is not clear from sensor information, the traffic information verification unit 218 determines in the embodiment that the traffic information is consistent with the sensor information.

Here, the embodiment describes the verification of position information on a vehicle, but the traffic information verification unit 218 also determines whether a speed or a movement direction of the vehicle is consistent with sensor information. When a movement speed or a movement direction of a vehicle existing at a position indicated by traffic information is different from a movement speed or a movement direction of the vehicle acquired from sensor information, the traffic information verification unit 218 determines that the traffic information is inconsistent with the sensor information. That is, when any of traffic information is inconsistent with sensor information, the traffic information verification unit 218 determines that the traffic information is inconsistent with the sensor information.

When the comparison between all the sensor information selected in step S304 and the traffic information is completed, the traffic information verification unit 218 determines whether the number of the sensor information inconsistent with the traffic information is a prescribed number or more (S306). Here, the prescribed number may be a fixed value set in advance. However, the prescribed number may be a value corresponding to the number of the sensor information acquired in step S304 or may be a value corresponding to the number of the sensor information consistent with the traffic information among the sensor information acquired in step S304.

When it is determined in step S306 that there is a lot of sensor information inconsistent with the traffic information (YES in S306), the traffic information verification unit 218 determines that the traffic information is invalid. This determination may be made based on whether the number of inconsistent sensor information (simple sum) is a prescribed number or more. However, it is more preferable to put weight on each of sensor information according to its information quality to make a determination based on whether the sum of the weight of inconsistent sensor information is a prescribed number or more. The signature information determination unit 220 determines signature information indicating the characteristics of the invalid traffic information (S307). For example, the signature information determination unit 220 may determine the transmission source ID 31 of the invalid traffic information as the signature information. The signature information transmission unit 222 transmits the determined signature information to the vehicle 100 via the wireless communication unit 204 (S308). Thus, the vehicle 100 is allowed to detect the invalid traffic information using the transmitted signature information.

When it is determined in step S306 that there is small number of sensor information inconsistent with the traffic information (NO in S306), the traffic information verification unit 218 determines that the traffic information is valid. Therefore, the determination and transmission processing of signature information is not performed.

In the way described above, the processing on the traffic information selected in step S303 is completed. When any unverified traffic information exists (YES in S309), the processing returns to step S303 to perform the same processing as the above on the unverified traffic information. When the verification processing on all the traffic information is completed (NO in S309), the processing is completed.

<Advantageous Effects of Embodiment>

According to the first embodiment, a vehicle is allowed to determine that traffic information inconsistent with information (sensor information) acquired by its sensor is invalid traffic information, i.e., an attack. Even in a case in which a vehicle is not allowed to detect invalid traffic information with its own sensor information, the vehicle is allowed to detect an attack based on the inconsistency between the traffic information and sensor information on other vehicles via a server.

Since electronic signatures are added to traffic information, a vehicle is allowed to detect an attack by spoofing or falsification. However, a vehicle is not allowed to detect an attack using the mechanism of electronic signatures when any reasonable person intentionally or unintentionally transmits invalid traffic information. However, as in the first embodiment, a vehicle is allowed to detect such an attack using signature information on invalid traffic information.

In the first embodiment, a server verifies traffic information using sensor information. Such verification requires relatively high calculation ability. However, since a server has higher calculation ability than that of an in-vehicle unit, the server is capable of performing a complicated analysis.

Modified Example

In the above description, a vehicle makes an alternative decision as to whether traffic information is valid or invalid in the verification processing of the traffic information. However, the reliability of traffic information may be evaluated at three or more levels. For example, the traffic information verification unit 218 may determine the reliability of traffic information according to the number of sensor information inconsistent with the traffic information. In addition, when it is not possible to determine whether traffic information and sensor information are definitely inconsistent with each other or definitely consistent with each other, the reliability of the traffic information may be determined using the accuracy. For a vehicle, it is preferable to determine to what extent a vehicle relies on traffic information to control the vehicle according to the reliability of the traffic information. For example, a vehicle performs control while ignoring traffic information whose reliability is the lowest. On the other hand, a vehicle may perform control on the assumption that traffic information with intermediate reliability is possibly valid or invalid.

The above embodiment describes a case in which traffic information transmitted from a vehicle includes a position, a movement speed, and a movement direction of the vehicle. However, information included in traffic information is not limited so long as it is associated with traffic. For example, information on traffic signals, information on obstacles existing on roads, information on traffic jams, information on road-surface conditions, or the like may be transmitted. Any traffic information transmitted from a vehicle is one capable of being generated based on sensor information on the vehicle. Accordingly, the validity of such traffic information may be verified in such a way that the traffic information is compared with sensor information on a vehicle.

The above embodiment describes a case in which a vehicle performs automatic driving control using traffic information transmitted from circumjacent objects. However, a vehicle may perform any control based on traffic information. For example, a vehicle may perform driving assistance control, information providing control for the passengers of the vehicle, or the like based on traffic information.

Second Embodiment

A second embodiment of the present invention describes a case in which invalid traffic information is detect only by a vehicle without a server. The configurations of a vehicle according to the second embodiment are the same as those shown in FIG. 2A except that the vehicle has the same function as that of the traffic information verification unit 218 that verifies traffic information based on sensor information and the vehicle does not have a function to perform transmission/reception with a server.

Figure 7:
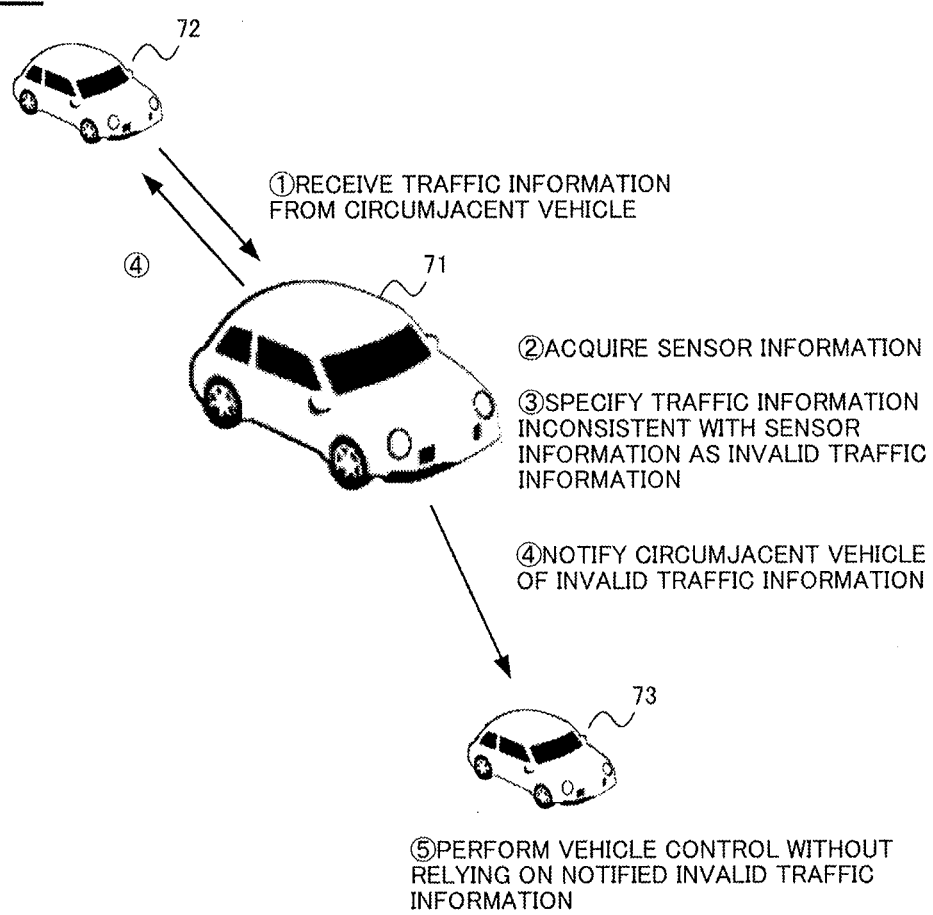
FIG. 7 is a diagram showing the outline of the system of a second embodiment.

FIG. 7 shows the outline of the system of the second embodiment. When receiving traffic information from a circumjacent vehicle 72, a vehicle 71 compares the received traffic information with sensor information acquired by its own sensor to verify whether the received traffic information is invalid. When the received traffic information is invalid, the vehicle 71 notifies circumjacent vehicles of the fact that the traffic information is invalid. A vehicle 73 having received the notification is allowed to know the fact that the traffic information is invalid. The system is effective particularly when the vehicle 71 is allowed to verify the validity of traffic information transmitted from the vehicle 72 but the vehicle 73 is not allowed to verify the traffic information with its own sensor information.

Figure 8:
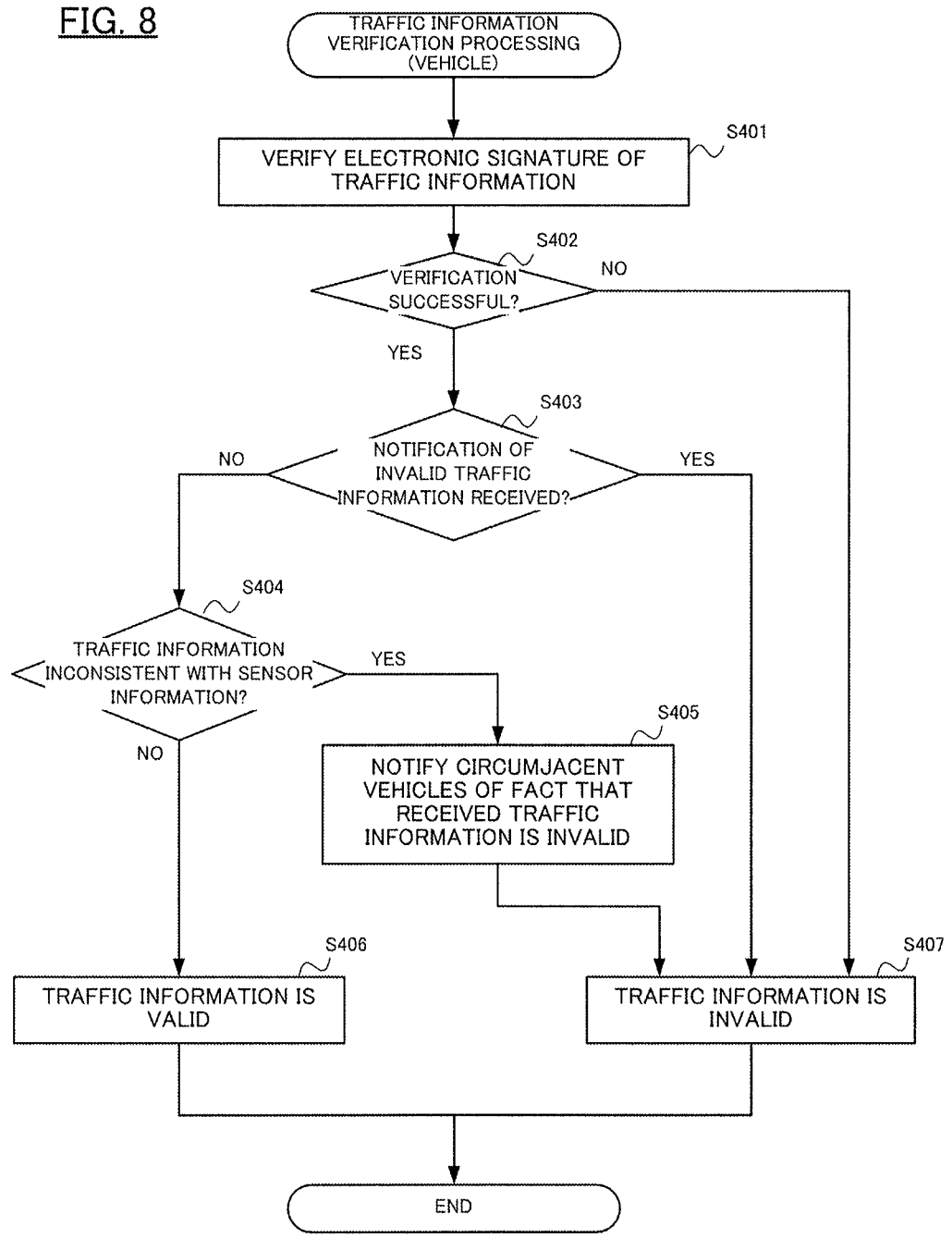
FIG. 8 is a flowchart showing traffic information verification processing by a vehicle in the second embodiment.

FIG. 8 is a flowchart showing the flow of traffic information verification processing by a vehicle in the second embodiment. The vehicle 71 verifies an electronic signature 38 of received traffic information with a cryptographic processing unit 124 (S401). When the verification fails (NO in S402), the content of the information is falsified or spoofed and thus the vehicle 71 is allowed to determine that the received traffic information is invalid (S407). On the other hand, when the verification of the signature is successful (YES in S402), it turns out that the content of the information is neither falsified nor spoofed. Even in this case, there is a possibility that the content of the traffic information is invalid. Therefore, an attack detecting unit 122 determines whether the received traffic information is consistent with invalid traffic information notified by a circumjacent vehicle (S403). Here, when the vehicle 71 has been already notified of the fact that the received traffic information is invalid (YES in S403), the vehicle 71 is allowed to determine that the received traffic information is invalid (S407). On the other hand, when the vehicle 71 has not been notified of the fact that the received traffic information is invalid (NO in S403), the vehicle 71 verifies whether the content of the received traffic information is inconsistent with sensor information acquired by its own sensor (S404). When the content of the received traffic information is inconsistent with the sensor information (YES in S404), the vehicle 71 is allowed to determine that the received traffic information is invalid. Then, the vehicle 71 notifies circumjacent vehicles of the fact that the traffic information is invalid (S405). Here, the vehicle 71 may notify the circumjacent vehicles of the transmission source ID of the invalid traffic information, the message ID of the invalid traffic information, or signature information as in the first embodiment. When the received traffic information is consistent with the sensor information (NO in S404), the vehicle 71 is allowed to determine that the traffic information is valid (S406).

According to the second embodiment, a vehicle is allowed to detect invalid traffic information and notify circumjacent vehicles of the invalid traffic information by itself without a server. Since the validity of traffic information is verified in real time by a vehicle without a server, the second embodiment is advantageous in that invalid traffic information is promptly notified.

Note that in the above processing, a vehicle notifies circumjacent vehicles of the fact that traffic information is invalid only when the traffic information is inconsistent with sensor information acquired by itself (NO in S404). However, a vehicle preferably transmits the above notification at any time when it is determined that traffic information is invalid.

Third Embodiment

A third embodiment of the present invention is almost the same as the second embodiment but is different in that the notification of invalid traffic information is transmitted not only from a vehicle but also from a server.

Figure 9:
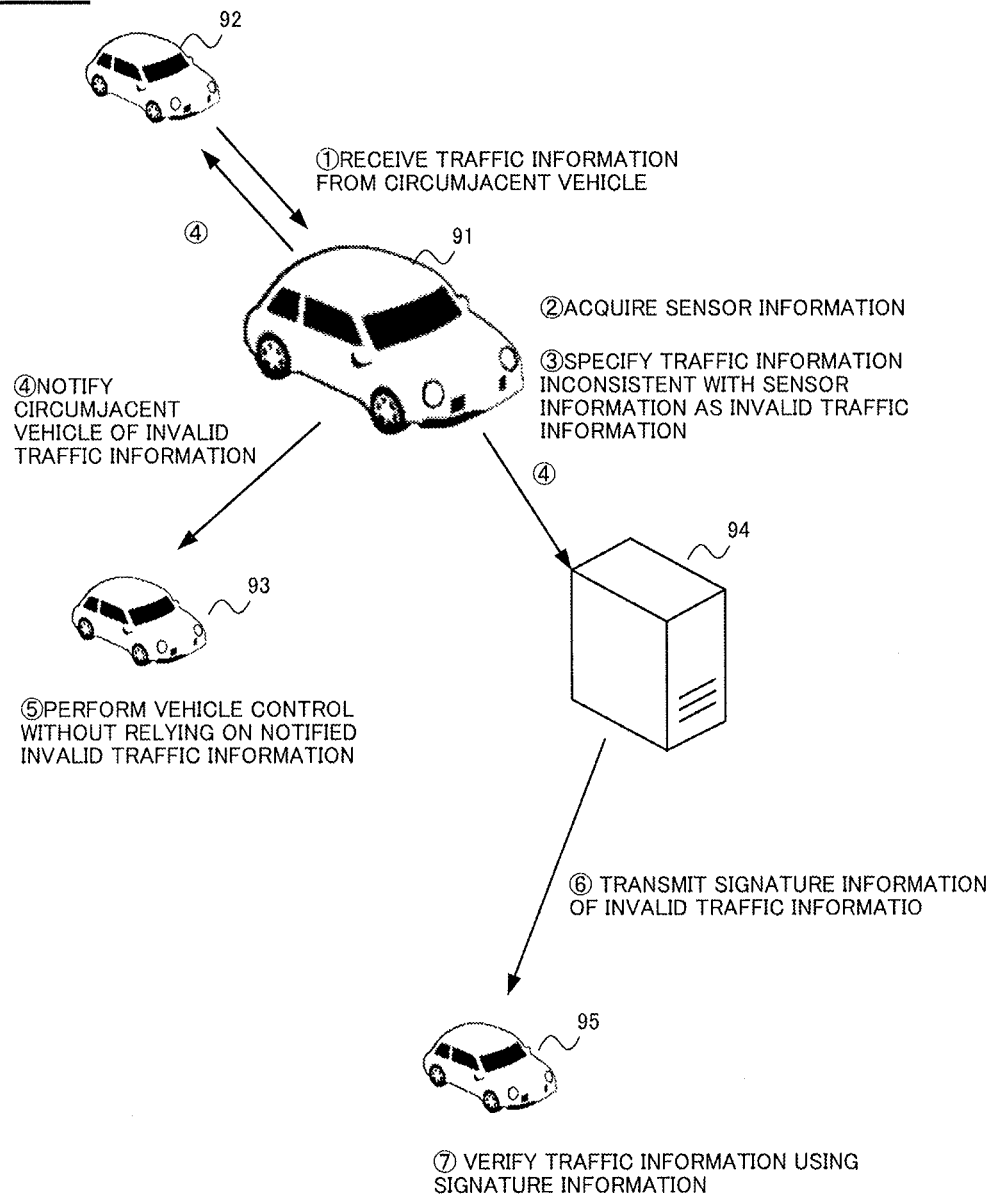
FIG. 9 is a diagram showing the outline of the system of a third embodiment.

FIG. 9 shows the outline of the system of the third embodiment. When receiving traffic information from a circumjacent vehicle 92, a vehicle 91 compares the received traffic information with sensor information acquired by its own sensor to verify whether the received traffic information is invalid. When the received traffic information is invalid, the vehicle 91 notifies circumjacent vehicles of the fact that the traffic information is invalid. A vehicle 93 having received the notification is allowed to know the fact that the traffic information is invalid. The system is effective particularly when the vehicle 91 is allowed to verify the validity of traffic information transmitted from the vehicle 92 by its own sensor but the vehicle 93 is not allowed to verify the traffic information with its own sensor information. The above point is the same as that of the second embodiment.

In the third embodiment, the vehicle 91 transmits the existence of the invalid traffic information not only to the circumjacent vehicle 93 but also to a server 94. Then, the server 94 transmits the notification of the invalid traffic information to other vehicles 95.

In the second embodiment, only a vehicle 71 having detected the inconsistency between traffic information and sensor information is allowed to notify circumjacent vehicles of the invalid traffic information. However, since the server 94 transmits information on invalid traffic information (signature information or the like) in the third embodiment, vehicles in a wide range are allowed to be notified of the invalid traffic information.

Note that in the third embodiment, a server preferably verifies whether the notification of traffic information from a vehicle indicating the invalidity of the traffic information is valid. For example, when only some of vehicles receiving the same traffic information notifies that the traffic information is invalid traffic information, the sever may determine that this notification is invalid.

Fourth Embodiment

It is also preferable to provide a system in which the first embodiment is combined with the second or the third embodiment. That is, it is also preferable to provide a system in which traffic information and sensor information are transmitted to a server so that the server detects invalid traffic information while a vehicle compares the traffic information with its own sensor information to detect the invalid traffic information.

Verification by a server has the advantage that the server is allowed to perform a higher analysis based on a lot of sensor information but also has the disadvantage that a vehicle requires a long time to be capable of detecting an attack using a verification result. On the other hand, verification by a vehicle has the advantage that the vehicle is allowed to promptly notify circumjacent vehicles of invalid traffic information although the vehicle performs an analysis based on only information acquired by its own sensor.

According to the fourth embodiment, it is possible to provide a more effective system in which a vehicle and a server are complementary to each other.

Other Embodiments

The present invention is constituted by a general-purpose processor such as a micro processor and a central processing unit (CPU) and a computer having a program stored in a memory, and may be realized when the general-purpose processor runs the program. In addition, the present invention may be realized by a dedicated processor such as an application specific integrated circuit (ASIC), a field programmable gate array (FPGA), and a digital signal processor (DSP). It can be said that each of a dedicated processor and a general-purpose processor running a program is a processor configured to provide a specific function or a processor configured to function as a specific function unit. In addition, some functions of the present invention may be provided by a general-purpose processor (and a program), and other functions may be realized by a dedicated processor. Moreover, one of the functions of the present invention may be realized by both a general-purpose processor (and a program) and a dedicated processor.

The above embodiments and the modified example are given only for illustration purpose in the present invention and do not intend to limit the present invention to their disclosed ranges. In addition, the constituent technologies described in the above embodiments and the modified example may be combined with each other to perform the present invention unless they are technologically contradictory to each other.

What is claimed is:

1. A system for detecting an attack, comprising a server and a plurality of vehicles capable of wirelessly communicating with each other,
   each of the plurality of vehicles including:
   a sensor; and
   a vehicle processor configured to act as:
      a sensor information acquisition interface adapted to acquire sensor information from the sensor; and
      a traffic information reception interface adapted to receive traffic information through wireless communication, wherein the traffic information is information that describes a road condition around the vehicle and is sent from an outside of the vehicle,
      wherein a cryptographic processor is configured to verify electronic signature data of the received traffic information and detect invalid traffic information using signature information notified from the server; and
   a transmitter adapted to transmit the sensor information and the traffic information to the server, and
   the server including:
   a server processor configured to act as:
      a specification controller to specify to at least any of the plurality of vehicles signature information indicating the characteristics of the invalid traffic information
      a reception controller adapted to receive the sensor information and the traffic information from at least any of the plurality of vehicles;
      a verification controller adapted to verify whether the sensor information and the traffic information are inconsistent with each other, the sensor information and the traffic information determined to be inconsistent with each other when the road condition indicated by the traffic information and a road condition derived from the sensor information do not match; and a notification controller adapted to notify, when the sensor information and the traffic information are inconsistent with each other, at least any of the plurality of vehicles of the inconsistency between the sensor information and the traffic information.

2. The system according to claim 1, wherein the notification controller is adapted to notify at least any of the plurality of vehicles of signature information indicating a characteristic of the traffic information inconsistent with the sensor information, and each of the plurality of vehicles has a storage unit adapted to store the signature information received from the server and does not rely on the traffic information consistent with the signature information notified from the notification controller.

3. The system according to claim 2, wherein, when the traffic information includes an identifier of a transmitter of the traffic information, the identifier of the transmitter of the traffic information is used as the signature information on the traffic information.

4. The system according to claim 1, wherein the traffic information includes a position of an object existing on a road, and the verification controller is adapted to determine the inconsistency between the sensor information and the traffic information when being able to estimate from the sensor information that the object does not exist at the position of the object indicated by the traffic information.

5. The system according to claim 4, wherein the traffic information further includes at least any of a movement speed and a movement direction of the object, and the verification controller is adapted to determine the inconsistency between the sensor information and the traffic information when being able to estimate from the sensor information that one of a movement speed and a movement direction of the object existing at the position of the object indicated by the traffic information is inconsistent with one of the movement speed and the movement direction indicated by the traffic information.

6. An system for detecting an attack, comprising:
a processor configured to act as: a first acquisition controller adapted to acquire sensor information acquired from a sensor of a vehicle;
a second acquisition controller adapted to acquire traffic information received by the vehicle through wireless communication, wherein the traffic information is information that describes a road condition around the vehicle and is sent from an outside of the vehicle wherein a cryptographic processor is configured to verify electronic signature data of the received traffic information and detect invalid traffic information using signature information notified from the server;
and a verification controller adapted to verify whether the sensor information and the traffic information are inconsistent with each other, the sensor information and the traffic information determined to be inconsistent with each other when the road condition indicated by the traffic information and a road condition derived from the sensor information do not match and wherein the server specifies the vehicle signature information indicating the characteristics of the invalid traffic information.

7. A method for detecting an attack, executed by a system comprising a server and a plurality of vehicles capable of wirelessly communicating with each other, at least one of the plurality of vehicles being a target vehicle and performing:

a sensor information acquisition step of acquiring sensor information from a sensor wherein a cryptographic processor is configured to verify electronic signature data of the received traffic information and detect invalid traffic information using signature information notified from a server;

a traffic information reception step of receiving traffic information through wireless communication, wherein the traffic information is information that describes a road condition around the vehicle and is sent from an outside of the target vehicle;

and a transmission step of transmitting the sensor information and the traffic information to the server, and the server performing: a reception step of receiving the sensor information and the traffic information from the target vehicle;

a verification step of verifying whether the sensor information and the traffic information are inconsistent with each other, the sensor information and the traffic information determined to be inconsistent with each other when the road condition indicated by the traffic information and a road condition derived from the sensor information do not match; and wherein the server specifies the vehicle signature information indicating the characteristics of the invalid traffic information;

and a notification step of notifying, when the sensor information and the traffic information are inconsistent with each other, at least one of the plurality of vehicles of the inconsistency between the sensor information and the traffic information.

8. A method for detecting an attack performed by a computer, the method comprising:
a first acquisition step of acquiring sensor information acquired from a sensor of a vehicle wherein a cryptographic processor is configured to verify electronic signature data of the received traffic information and detect invalid traffic information using signature information notified from a server,
a second acquisition step of acquiring traffic information received by the vehicle through wireless communication, wherein the traffic information is information that describes a current road condition around the vehicle and is sent from an outside of the vehicle;
and a verification step of verifying whether the sensor information and the traffic information are inconsistent with each other, the sensor information and the traffic information determined to be inconsistent with each other when the road condition indicated by the traffic information and a road condition derived from the sensor information do not match and wherein the server specifies the vehicle signature information indicating the characteristics of the invalid traffic information.

9. A non-transitory computer-readable medium having recorded thereon a computer program for causing a computer to perform:
a sensor information acquisition step of acquiring sensor information from a sensor;
a traffic information reception step of receiving traffic information through wireless communication, wherein the traffic information is information that describes a current road condition around the vehicle and is sent from an outside of a target vehicle of a plurality of vehicles wherein a cryptographic processor verifies electronic signature data of the received traffic information and detect invalid traffic information using signature information notified from a server;

a transmission step of transmitting the sensor information and the traffic information to the server;

a reception step of receiving the sensor information and the traffic information from the target vehicle;

a verification step of verifying whether the sensor information and the traffic information are inconsistent with each other, the sensor information and the traffic information determined to be inconsistent with each other when the road condition indicated by the traffic information and a road condition derived from the sensor information do not match and wherein the server specifies the vehicle signature information indicating the characteristics of the invalid traffic information;

and a notification step of notifying, when the sensor information and the traffic information are inconsistent with each other, at least one of the plurality of vehicles of the inconsistency between the sensor information and the traffic information.

10. A non-transitory computer-readable medium having recorded thereon a computer program for causing a computer to perform:

a first acquisition step of acquiring sensor information acquired from a sensor of a vehicle; wherein a cryptographic processor verifies electronic signature data of the received traffic information and detect invalid traffic information using signature information notified from a server;

a second acquisition step of acquiring traffic information received by the vehicle through wireless communication;

and a verification step of verifying whether the sensor information and the traffic information are inconsistent with each other, the sensor information and the traffic information determined to be inconsistent with each other when the road condition indicated by the traffic information and a road condition derived from the sensor information do not match and wherein the server specifies the vehicle signature information indicating the characteristics of the invalid traffic information.

* * * * *